(12) United States Patent
Lawson et al.

(10) Patent No.: US 7,644,206 B2
(45) Date of Patent: Jan. 5, 2010

(54) COMMAND QUEUE ORDERING BY POSITIONALLY PUSHING ACCESS COMMANDS

(75) Inventors: Gabriel J. Lawson, Monument, CO (US); Mark A. Gaertner, Vadnais Heights, MN (US); Kenneth H. Bates, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/479,106

(22) Filed: Jun. 30, 2006

(65) Prior Publication Data

US 2008/0059708 A1 Mar. 6, 2008

(51) Int. Cl.
*G06F 3/00* (2006.01)
*G06F 13/28* (2006.01)
*G06F 12/00* (2006.01)

(52) U.S. Cl. .................. 710/54; 710/5; 710/6; 710/24; 710/39; 710/52; 711/111; 711/112; 711/158

(58) Field of Classification Search ........................ None
See application file for complete search history.

(56) References Cited

U.S. PATENT DOCUMENTS

| | | | |
|---|---|---|---|
| 5,390,313 A | 2/1995 | Yanai et al. | |
| 5,426,736 A | 6/1995 | Guineau, III | |
| 5,463,758 A | 10/1995 | Ottesen | |
| 5,664,143 A | 9/1997 | Olbrich | |
| 5,787,242 A | 7/1998 | DeKoning et al. | |
| 5,828,902 A * | 10/1998 | Tanaka et al. | 710/39 |
| 5,854,941 A | 12/1998 | Ballard et al. | |
| 5,873,125 A * | 2/1999 | Kawamoto | 711/202 |
| 5,887,128 A | 3/1999 | Iwasa et al. | |
| 6,018,790 A | 1/2000 | Itoh et al. | |
| 6,028,725 A | 2/2000 | Blumenau | |
| 6,061,194 A | 5/2000 | Bailey | |
| 6,070,225 A | 5/2000 | Cheung et al. | |
| 6,076,143 A | 6/2000 | Blumenau | |
| 6,098,149 A * | 8/2000 | Ofer et al. | 711/112 |
| 6,272,565 B1 * | 8/2001 | Lamberts | 710/43 |
| 6,332,177 B1 | 12/2001 | Humlicek | |
| 6,397,292 B1 | 5/2002 | Venkatesh et al. | |
| 6,412,042 B1 | 6/2002 | Paterson et al. | |
| 6,425,052 B1 | 7/2002 | Hashemi | |
| 6,442,648 B1 | 8/2002 | Genduso et al. | |
| 6,457,096 B1 | 9/2002 | Ageishi et al. | |
| 6,490,636 B1 | 12/2002 | Kikuchi et al. | |
| 6,502,178 B1 * | 12/2002 | Olbrich | 711/202 |
| 6,571,298 B1 * | 5/2003 | Megiddo | 710/5 |
| 6,574,676 B1 | 6/2003 | Megiddo | |
| 6,654,850 B2 * | 11/2003 | Fox et al. | 711/111 |

(Continued)

OTHER PUBLICATIONS

Anderson, Dave. "You Don't Know Jack About Disk." Queue (ACM). Jun. 2003: 20-30.*

*Primary Examiner*—Henry Yu
(74) *Attorney, Agent, or Firm*—Fellers, Snider, et al.

(57) ABSTRACT

A data storage system is provided with command queue controller circuitry for positionally pushing pending access commands from a command queue to a selected target zone of a storage space. A method is provided for dividing a storage space into a plurality of LBA zones, selecting a target zone in relation to a number of pending access commands for each of the plurality of LBA zones, and pushing access commands to the target zone.

14 Claims, 8 Drawing Sheets

U.S. PATENT DOCUMENTS

| | | | |
|---|---|---|---|
| 6,725,327 B1 * | 4/2004 | Espeseth et al. | 711/112 |
| 6,868,477 B2 * | 3/2005 | Hoskins et al. | 711/112 |
| 6,880,102 B1 | 4/2005 | Bridge | |
| 6,931,501 B1 * | 8/2005 | Narayanaswamy et al. | 711/158 |
| 6,978,324 B1 | 12/2005 | Black | |
| 6,978,345 B2 | 12/2005 | Tomaszewski et al. | |
| 7,003,644 B2 * | 2/2006 | Heath et al. | 711/167 |
| 7,043,567 B2 * | 5/2006 | Trantham | 710/6 |
| 7,206,866 B2 * | 4/2007 | Hendel et al. | 710/6 |
| 2002/0083299 A1 | 6/2002 | Van Huben et al. | |
| 2002/0091882 A1 | 7/2002 | Espeseth et al. | |
| 2002/0124132 A1 * | 9/2002 | Haines et al. | 711/112 |
| 2003/0163639 A1 * | 8/2003 | Baum et al. | 711/113 |
| 2003/0225969 A1 | 12/2003 | Uchida et al. | |
| 2004/0015653 A1 * | 1/2004 | Trantham | 711/113 |
| 2004/0202073 A1 | 10/2004 | Lai et al. | |
| 2005/0015543 A1 * | 1/2005 | Krantz et al. | 711/112 |
| 2005/0097132 A1 | 5/2005 | Cochran et al. | |
| 2007/0130391 A1 * | 6/2007 | Aihara | 710/52 |

* cited by examiner

COMMAND QUEUE ORDERING BY POSITIONALLY PUSHING ACCESS COMMANDS

FIELD OF THE INVENTION

The present invention pertains generally to enhancing throughput performance in a computer system, and more particularly without limitation to an apparatus and associated method for ordering a command queue in a storage space to positionally push the commands and thereby reduce the average seek distance.

BACKGROUND

Computer systems can comprise input devices, output devices, one or more CPUs and storage devices that can include semiconductor RAM, EEPROM, disc drives, CD drives, other storage media, and intelligent controllers. An operating system can control the configuration of various peripherals, such as display adapters and network interfaces, for example, and provides an application environment and a data system that allocates or de-allocates storage capacity as files are created, modified, or deleted.

Specialized computer systems, such as servers and storage arrays, also employ a system for allocating storage capacity that can be accessed through a network or other connection. Data can be stored across a plurality of disc drives in redundant storage formats such as a redundant array of independent drives (RAID), for example. User data, and any mirror data or parity data ("redundant data"), is mapped to one or more areas on one or more disc drives. Configuration information describing the manner in which data is stored to one or more disc drives is contained in tables or other data structures termed metadata. As files are created, modified, or deleted, the metadata is updated to reflect the allocation or de-allocation of storage capacity.

The performance of the computer system in passing host access commands (both store and retrieve commands) to the storage array can be enhanced by write-caching the access commands and immediately acknowledging them to the host. This permits the actual transfer between the storage array and the cache to take place at an optimal time in relation to holistically viewing system resources against system needs. For example, many times access commands that are pending in the command queue can be performed when the data storage device is otherwise not presently needed by the system.

However, allowing the command queue to grow deep can bog down the system throughput performance, and makes data mismatches more problematic by accumulating an excessive number of acknowledged but not yet satisfied access commands. For this reason it is desirable to pass commands in the command queue as efficiently as possible.

Accordingly, there is a continual need for improvements in the manner in which command queues are managed. It is to these and other improvements that the embodiments of the present invention are generally directed.

SUMMARY OF THE INVENTION

As embodied herein and as claimed below, embodiments of the present invention are generally directed to efficient command queue scheduling to maximize data storage system throughput performance.

In some embodiments a data storage system is provided with a command queue controller circuitry for positionally pushing pending access commands from a command queue to a selected target zone of a storage space.

In other embodiments a method is provided for: dividing a storage space into a plurality of LBA zones; selecting a target zone in relation to a number of pending access commands for each of the plurality of LBA zones; and pushing access commands to the target zone.

In other embodiments a data storage device is provided having a transducer in a data transfer relationship with a storage space, and means for ordering commands that are pending in a command queue to positionally push the commands to the storage space.

These and various other features and advantages which characterize the embodiments of the claimed invention will become apparent upon reading the following detailed description and upon reviewing the associated drawings.

DETAILED DESCRIPTION

Figure 1:
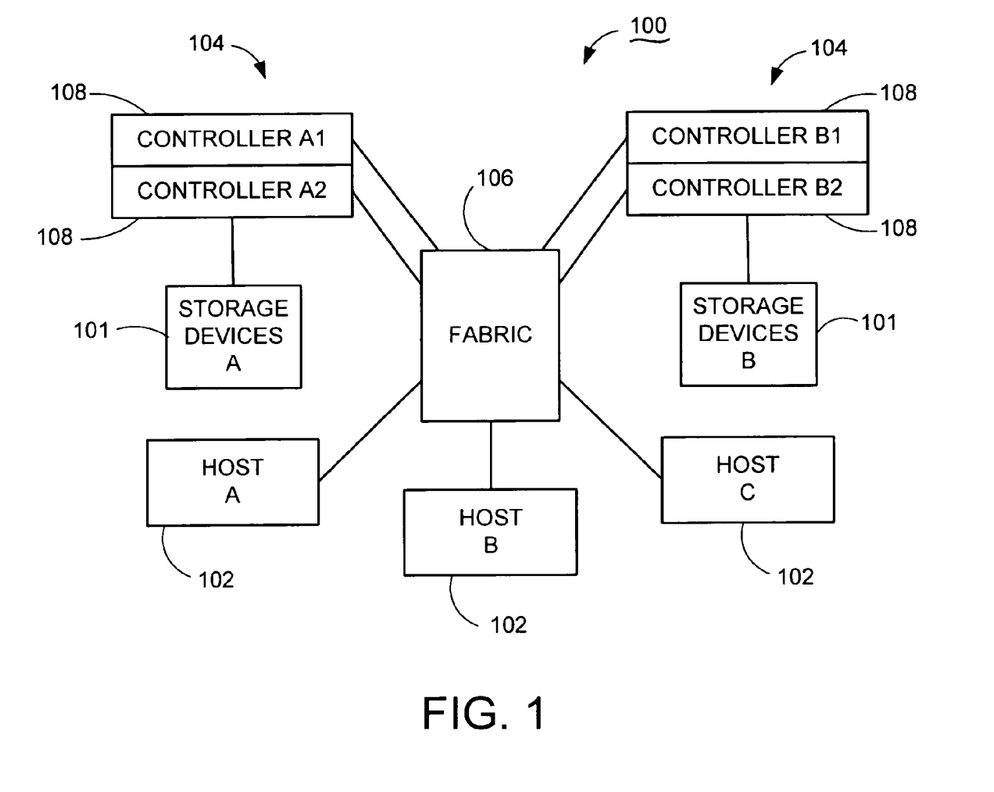
FIG. 1 is a top level functional block depiction of a computer-based system characterized as a wide-area network utilizing mass storage.

Embodiments of the present invention can be employed in various environments such as computers or servers with internal or attached data storage devices, or in an intelligent storage system. Intelligent storage systems have intelligent controllers and interfaces that can have one or more data storage arrays. To illustrate an exemplary environment in which presently preferred embodiments can be advantageously practiced, FIG. 1 shows a computer-based system 100 characterized as a wide area network (WAN) utilizing mass storage.

The system 100 includes a number of host computers 102, respectively identified as hosts A, B, and C. The host computers 102 interact with each other as well as with a pair of data storage arrays 104 (denoted A and B, respectively) via a fabric 106. The fabric 106 is preferably characterized as a fibre-channel based switching network, although other configurations can be utilized as well, including the Internet.

Each array 104 includes a pair of controllers 108 (denoted A1, A2 and B1, B2) and a set of data storage devices (characterized below as a "multiple drive array" or "MDA") 101 presently characterized as having disc drives, without limitation, and operated as a RAID. The controllers 108 and set of data storage devices 101 preferably utilize a fault tolerant arrangement so that the various controllers 108 utilize parallel, redundant links and at least some of the user data stored by the system 100 is stored in a redundant format within at least one set of the data storage devices 101.

It is further contemplated that the A host computer 102 and the A data storage array 104 can be physically located at a first site, the B host computer 102 and B storage array 104 can be physically located at a second site (remotely to A and C), and the C host computer 102 can be yet at a third site (remotely to A and B), although such is merely illustrative and not limiting.

Figure 2:
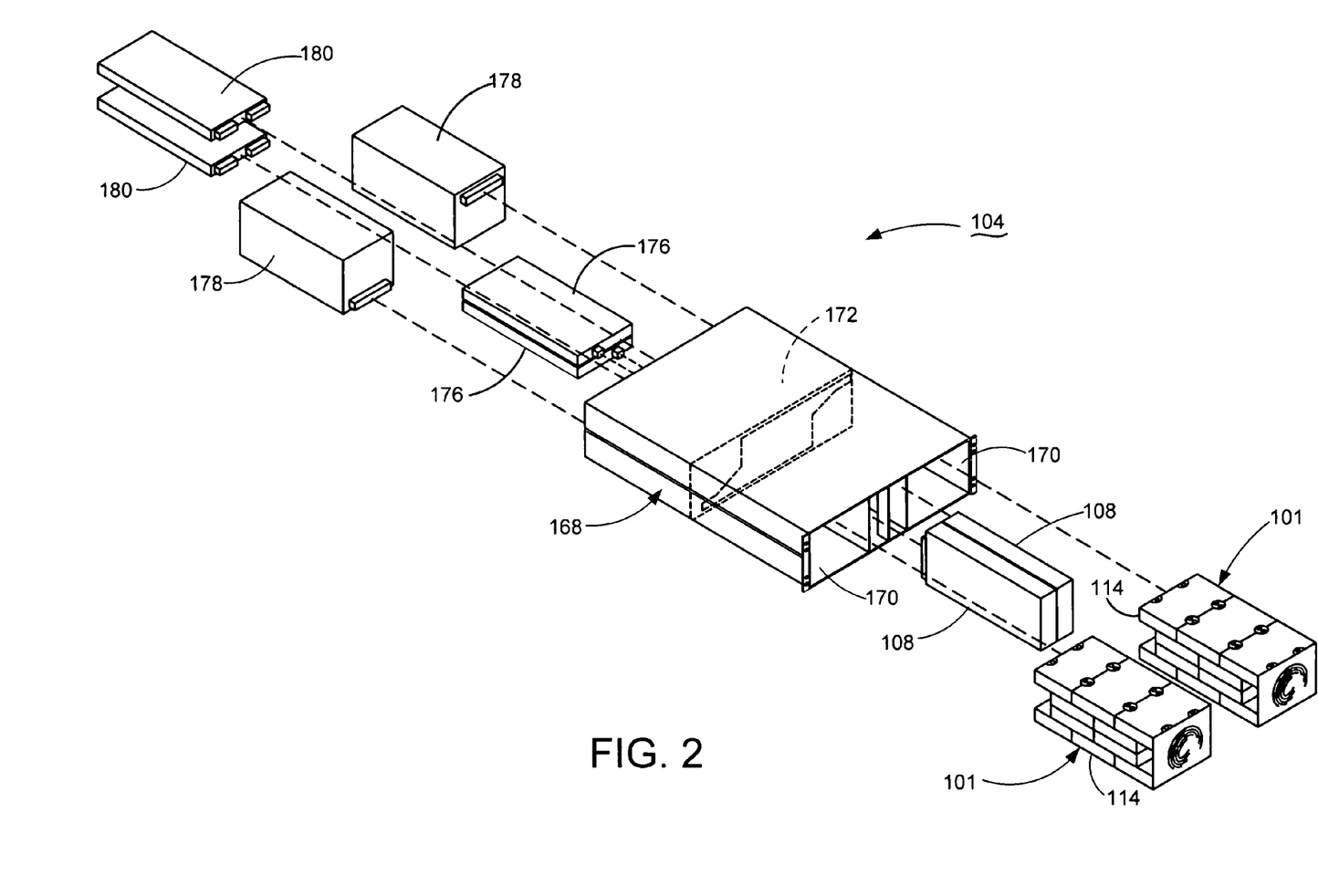
FIG. 2 is an exploded isometric view of a pertinent portion of a computer-based system constructed in accordance with FIG. 1.

FIG. 2 illustrates an array 104 that is constructed in accordance with embodiments of the present invention. Two MDAs 101 are utilized, each with a capacity often data storage devices 114. The MDA 101 advantageously provides a convertible plurality of the data storage devices 114 for mass storage. By "convertible" it is meant that one or more of the data storage devices 114 can be readily replaced, added, or removed in an existing MDA 101, or that a different MDA can be utilized that is capable of supporting a different number, size or arrangement of data storage devices 114. By "componentized" it is meant that the data storage devices 114 and associated control electronics in the MDA 101 are collectively integrated so as to be functionally presentable by the array 104 as a seamless block of storage capacity.

Figure 3:
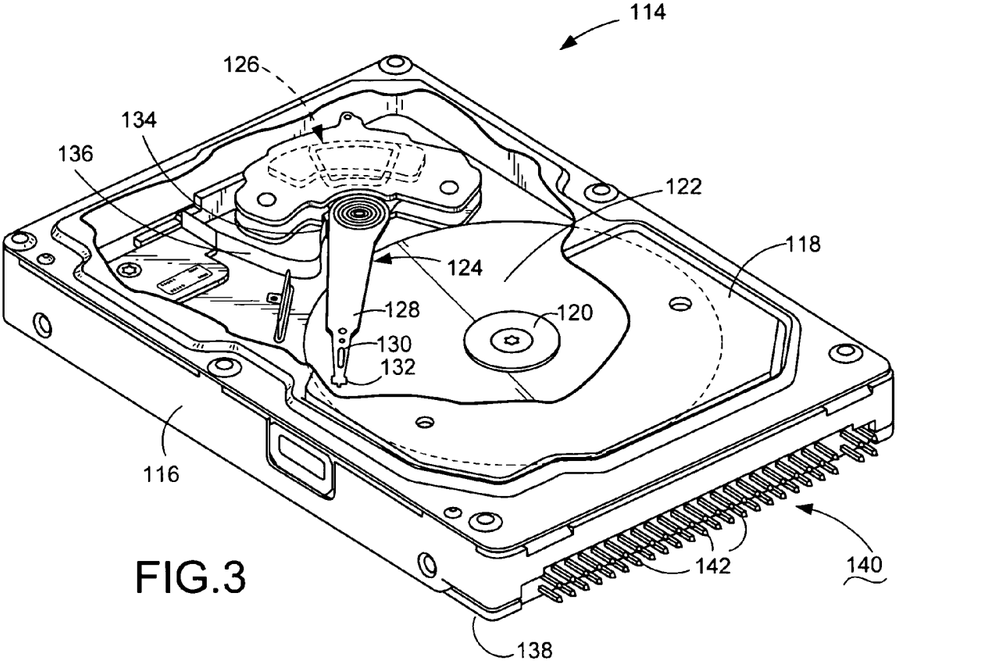
FIG. 3 is an isometric view of a data storage device that can be used in practicing the embodiments of the present invention.

FIG. 3 shows an isometric view of one of the data storage devices 114 with which embodiments of the present invention can be advantageously practiced. It will be understood, however, that the embodiments of the present invention are not so limited.

The device 114 preferably includes a base 116 and a cover 118 (partially cutaway), which together provide a housing for a number of components. The components include a motor 120 to which is fixed one or more storage mediums 122 in rotation therewith. Adjacent the storage medium 122 is an actuator assembly 124 that pivots around a bearing assembly through application of current to a voice coil motor (VCM) 126. In this way, controlled operation of the VCM 126 causes the actuator 124 to move radially across the storage medium 122.

The actuator assembly 124 includes an actuator arm 128 supporting a load arm 130 that, in turn, supports a head 132 (or "transducer") at a distal end thereof in a data transfer relationship with the adjacent storage medium 122. Each storage medium 122 can be divided into data tracks, and the head 132 is positionable to retrieve data from and store data to the tracks.

To provide the requisite electrical conduction paths between the head 132 and device 114 control circuitry, the head 132 advantageously has a flex circuit that is routed on the actuator assembly 124 from the head 132, along the load arm assembly 130 and the actuator arm 128, and to a circuit portion 134 that is supported by a proximal end (sometimes referred to as "E block") of the actuator assembly 124. The circuit portion 134 connects the head 132 flex circuit to another flex circuit 136 which passes through the base 116 to a printed circuit board (PCB) 138. An electrical connector 140 attached to the PCB 138 has a plurality of contacts 142 for connecting the device 114 to a mating connector (not shown), such as for placing the device 114 in communication with external control circuitry.

Figure 4:
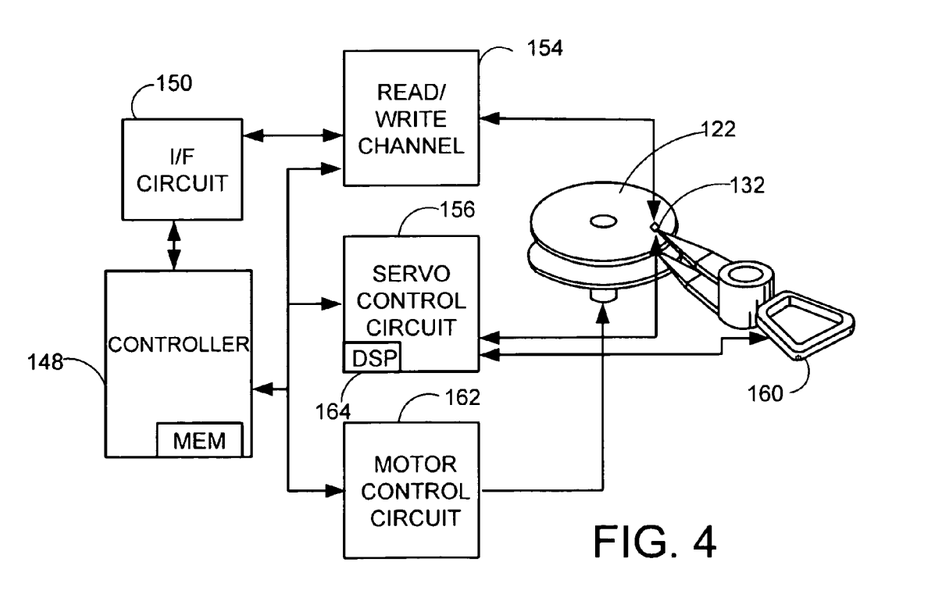
FIG. 4 is a functional block depiction of the data storage device of FIG. 3.

FIG. 4 provides a functional block diagram of the device 114 of FIG. 3. A programmable controller 148 provides top-level communications and control for the device 114. An interface (I/F) 150 facilitates input and output (I/O) communications and transfers to an external device with which the device 114 can be associated. A read/write (R/W) channel 154 conditions data to be written to the storage medium 122 during a data store operation, and reconstructs data retrieved from the storage medium 122 for transfer to the external device during a data retrieve operation.

A servo control circuit 156 provides closed-loop positional control for the heads 132, such as by using servo data stored to the storage medium 122. The servo control circuit 156 is preferably configured to carry out a number of control functions including track following operations whereby a selected head 132 follows a corresponding track on the storage medium 122, seek operations whereby a selected head 132 is moved from an initial track to a destination track, and head 132 load/unload operations whereby the heads 132 are moved away from or to a parking zone or structure.

The servo control circuit 156 applies the requisite currents to a coil 160 of the VCM 126 to selectively move the heads 132 in relation to the tracks of the storage medium 122. The servo control circuit 156 further preferably includes a spindle motor control circuit 162 to control the spindle motor 120. Processing requirements to carry out these and other servo functions are preferably supplied by a digital signal processor (DSP) 164 or other processing device of the servo control circuit 156, such as an ARM. The servo processing can alternatively be supplied by the top level controller 148 in a single processor environment.

Returning now to FIG. 2, a shelf 168 defines cavities 170 into each of which an MDA 101 is receivingly engageable for communication with a backplane 172. Similarly, the shelf 168 defines cavities for receivingly engaging other electrical modules with the backplane 172, such as, but not limited to, storage controllers 108, batteries 176, power supplies 178, and interfaces 180.

Figure 5:
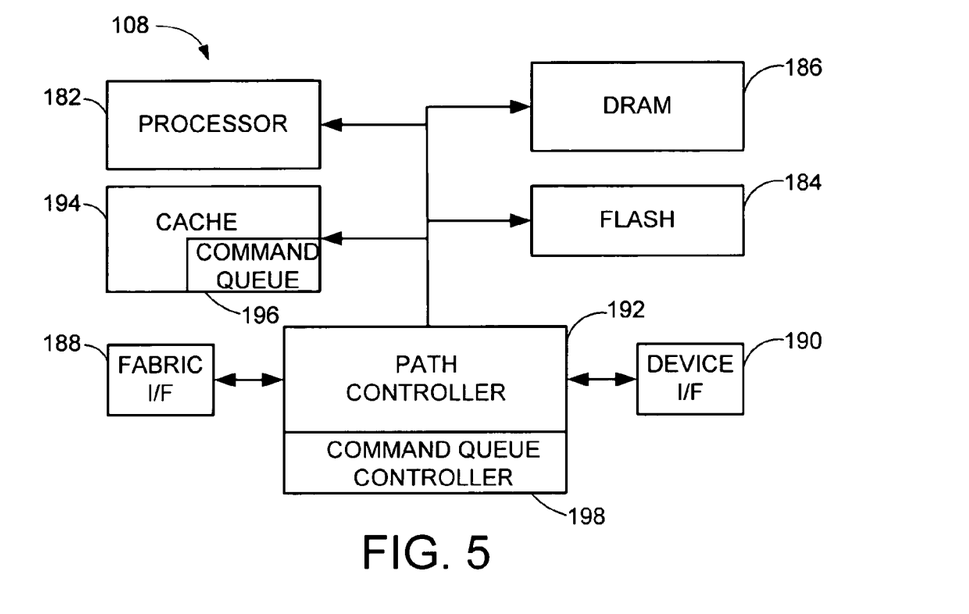
FIG. 5 provides a functional block diagram illustrating a selected one of the controllers of FIG. 1.

FIG. 5 illustrates a selected one of the controllers 108 in greater detail. The controller 108 can be embodied in a single integrated circuit, or distributed among a number of discrete circuits as desired. A main processor 182, preferably characterized as a programmable, computer processor, provides control in accordance with programming steps and processing data preferably stored in non-volatile memory 184 (such as flash memory or similar) and in dynamic random access memory (DRAM) 186.

A fabric interface (I/F) circuit 188 communicates with the other controllers 108 and the host computers 102 via the fabric 106, and a device I/F circuit 190 communicates with the storage devices 114. The I/F circuits 188, 190 and a path controller 192 form a communication path to pass commands and data between the storage array 104 and the host 102, such as by employing the cache memory 194. Although illustrated discretely, it will be understood that the path controller 192 and the I/F circuits 188, 190 can be unitarily constructed.

Preferably, in order to increase host processing performance, write commands are write-back cached in the cache memory 194 and held as pending therein within a command queue 196. A command queue controller 198 portion of the path controller 192 orders the passing of the write commands, as well as higher priority read commands, according to the embodiments of the present invention.

The data storage capacity of an array 104, defined by the combined capacities of the data storage devices 114, is organized into logical devices that can be written to and read from the array 104. System configuration information defines the relationship between user data, as well as any associated parity and mirror data ("redundant data"), with the respective storage locations. The system configuration information furthermore identifies the relationship between blocks of storage capacity allocated to data and the memory storage locations, such as logical block addresses (LBA). The system configuration information can furthermore include virtualization by defining virtual block addresses that are mapped to logical block addresses.

Embodiments of the present invention employ a data storage grid architecture mapped across a plurality of the data storage devices 114. A data grid comprises a plurality of consecutive data blocks in a plurality of storage domains. A first data block of each plurality of data blocks for each of the storage domains is typically at the same address (called a grid base address), simplifying address generation; however, differing base addresses for two or more storage domains can be employed. The grid provides a predefined amount of data storage space. The amount of data storage space in a grid can be allocated to one logical unit, and grids can be virtually mapped in simplifying metadata overhead.

Figure 6:
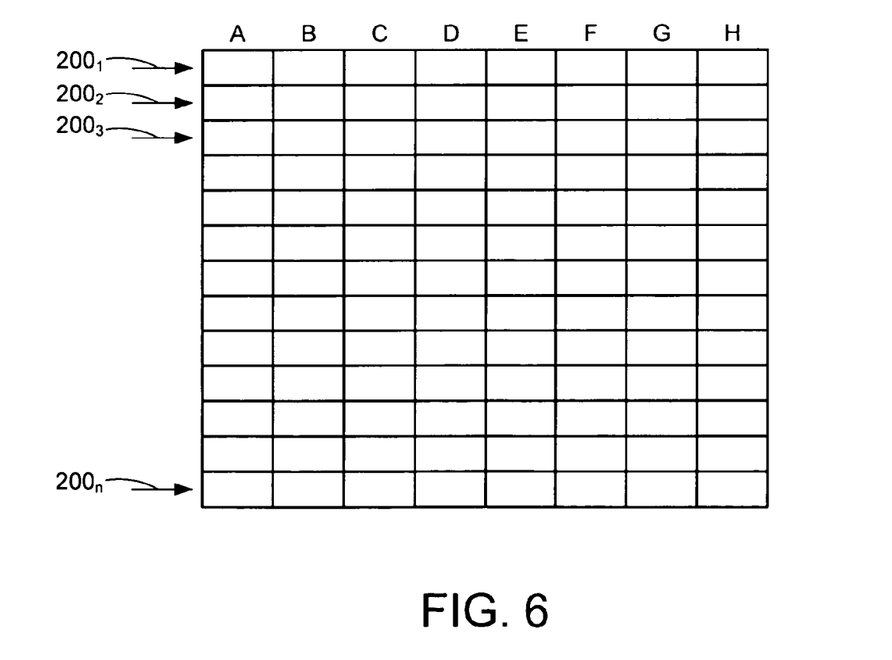
FIG. 6 is a diagrammatic illustration of a data storage grid employing a RAID 1 storage system in accordance with illustrative embodiments of the present invention.

FIG. 6 depicts a data storage grid that can be viewed as a two dimensional array of equal-sized data blocks. Columns in the array correspond to data storage devices 114 and rows correspond to data blocks starting at the same LBA in each data storage device 114. Accordingly, the data storage grid in FIG. 6 has a plurality of rows 200 that intersect the data storage devices 114 (domains) designated A, B, C, D, E, F, G, and H to define the array of data blocks.

Data blocks in a grid are of equal size (storage capacity) but are not limited to a particular size. The size of a data block can be specified when configuring a storage system and can reflect the size (storage capacity) of data storage devices in the system, user applications, controller hardware and software, and other factors. Rows 200 are contiguous in that there is no undefined storage space between adjacent rows of the grid. The starting address of the first row in the grid serves as the base address for the grid, and grids can be defined such that the base address is aligned to an address that is a multiple of the size of a data storage block multiplied by the number of rows in a grid.

Grids can be numbered, and the storage capacity contained in a grid can be allocated using a pointer to the grid. A pointer table can associate a pointer with a grid number, providing easy virtualization and reducing metadata overhead. Pluralities of grids can be defined that occupy a portion of the available storage capacity of the data storage devices in the array. Drives or data blocks of grids can be designated as spare(s), providing additional storage capacity that can be employed to contain reconstructed or copied data in the event of failure of other data storage devices in the system. Data blocks in a grid can also be dedicated for use in storing only primary user data or in storing only redundant data for error recovery.

For illustrative purposes the storage grid in FIG. 6 can be divided to allocate the first four domains A, B, C, D for storing primary (user) data and the last four domains E, F, G, H for mirroring the primary data in a RAID 1 configuration. For the sake of simplicity, the virtualized storage space is mapped to the storage grid beginning at the same LBA in each of the domains. Furthermore, data stored in primary domain A is mirrored in redundant domain E, and so forth.

Figure 7:
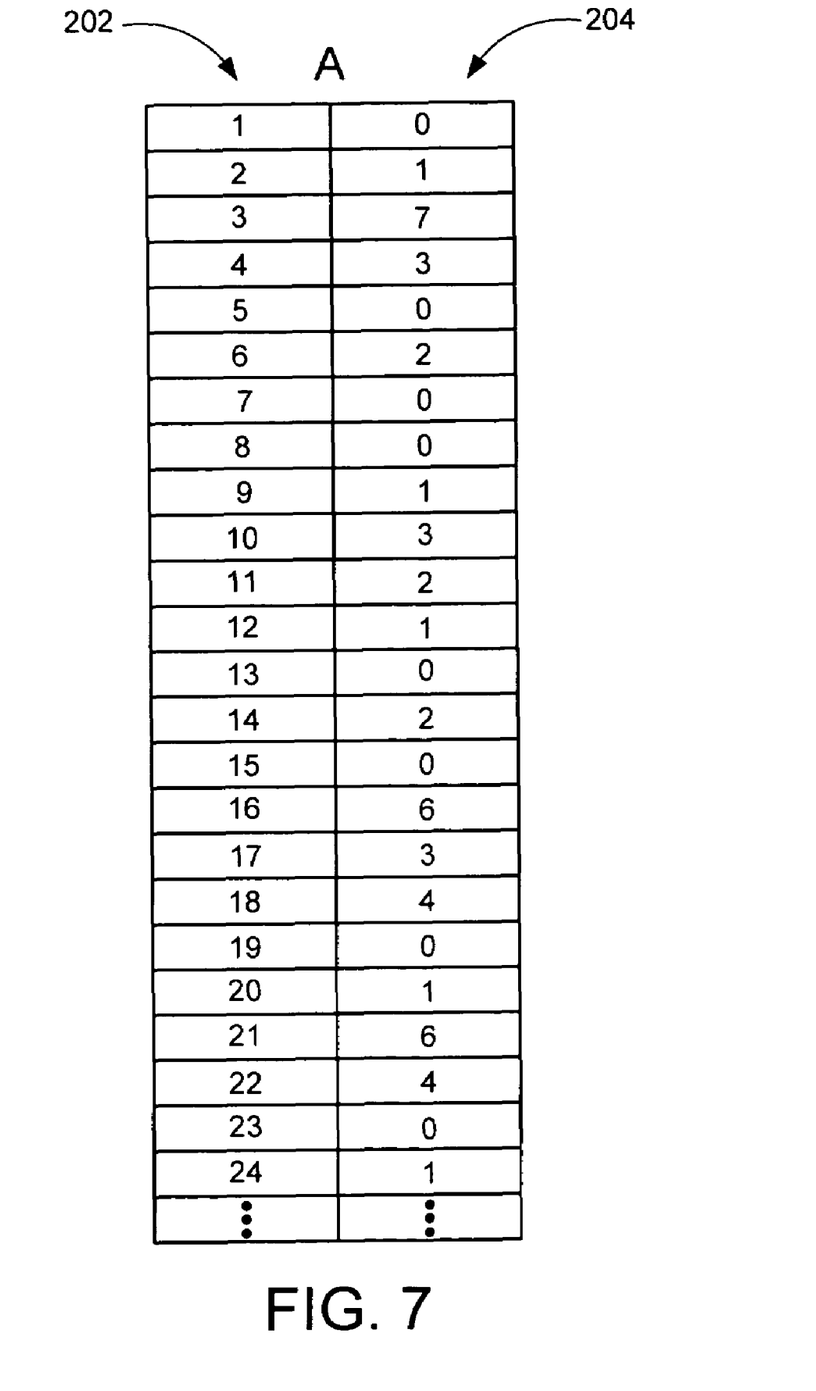
FIG. 7 is an illustrative data set indicating the number of pending access commands in the command queue for each of the first twenty-four tracks of the data storage medium in the data storage device of FIG. 3.

For the sake of this description, FIG. 7 is an illustrative data table, as can be stored in computer memory, showing the number of pending access commands destined for each of the first twenty-four tracks of domain A. That is, column 202 represents the track number of the storage space in domain A, and column 204 represents the respective number of pending access commands in the command queue 196.

In the present embodiments the command queue controller 198 has circuitry for positionally pushing the pending access commands from the command queue 196 to a selected target zone of the storage space in the domain. For purposes of this description and meaning of the appended claims, the term "positionally" in the context of "positionally pushing" the pending access commands is distinguishable over directional pushing algorithms such as SCAN and CSCAN algorithms. By "positionally pushing" it is meant that the actuator 124 moves the head 132 to a position of the storage medium 122 where the greatest number of access commands can be pushed with a corresponding minimal seek overhead. Positional pushing more efficiently flushes pending access commands from the command queue than directional pushing does.

The selected target zone is determined by comparing the densities of pending access commands in the storage space in relation to each of a number of candidate zones. By moving the actuator to a high density zone of pending access commands, a relatively higher number of commands can be pushed with relatively smaller seeks, thereby increasing the efficiency with which the command queue 196 can be flushed.

Figure 8:
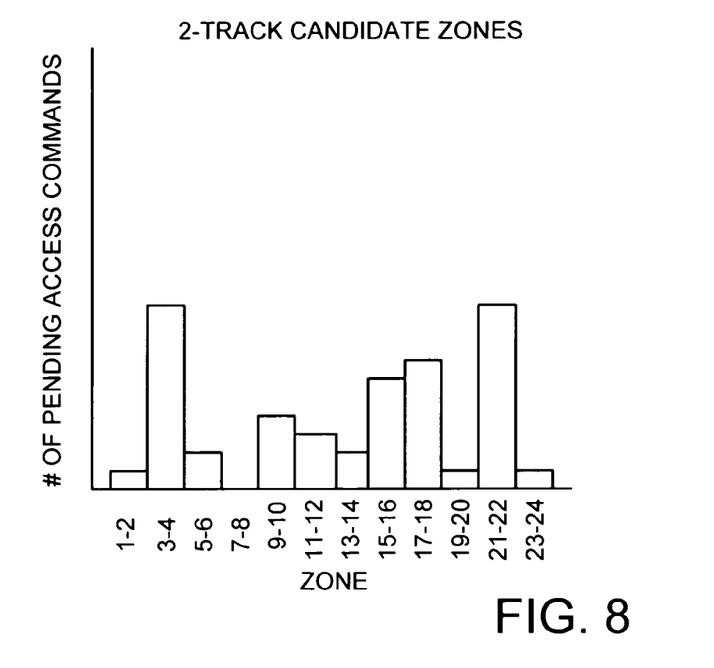
FIG. 8 is a histogram of the pending access command densities for the data set of FIG. 7 and a candidate zone size of two tracks.

For example, in some embodiments the circuitry selects the target zone by comparing the numbers of pending access commands in different fixed-size LBA zones of the storage space. For example, FIG. 8 is a histogram showing the number of pending access commands in zones that are two tracks wide and beginning at track 1. That is, in the first candidate zone consisting of tracks 1 and 2 there is one pending access request; in the second candidate zone consisting of tracks 3 and 4 there are ten pending access requests, and so on.

The number of tracks used to define the zones can be varied from one to any plurality that suits the user's needs. Generally, however, it is advantageous to start with determining whether a target zone can be identified with a relatively small zone size. This is due to the fact that a discernible target zone of a narrow width can be marginalized quicker because of the reduced seek overhead needed to push the access commands.

The data of FIG. 8, however, is problematic because there is no clear target zone at this point in time for candidate zones that are two tracks wide. There are two zones, zone 3-4 and zone 2-22, that both have the highest number (ten) of pending access requests. In some embodiments the command queue controller 198 circuitry moves the actuator to either one of the highest density zones and dwells there while pushing access commands. Once completed there, either the densities can be recalculated to account for any change in the densities, or the actuator can be moved to the other of the highest density zones and dwell there while pushing access commands.

Figure 9:
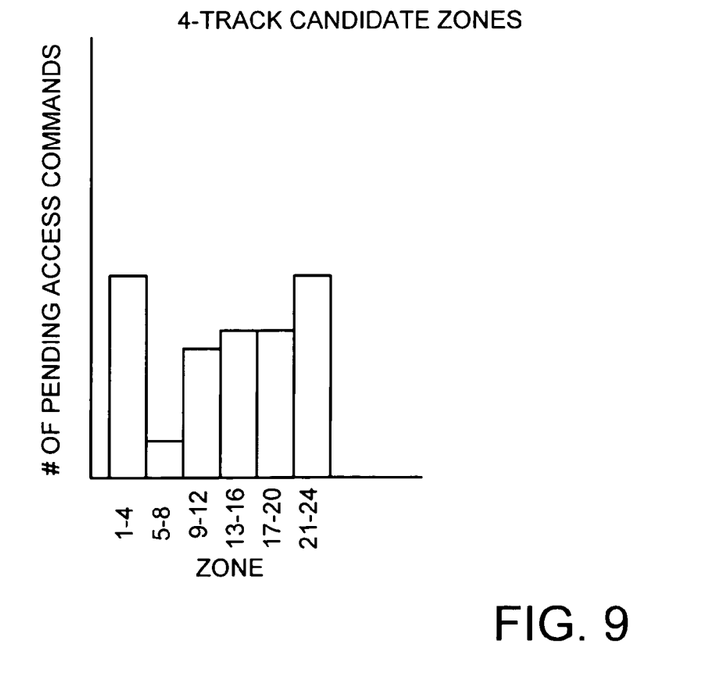
FIG. 9 is a histogram of the pending access command densities for the data set of FIG. 7 and a candidate parent zone size of four tracks.

In other embodiments, however, the candidate zone size can be manipulated in an attempt to better discern the best candidate target zone. FIG. 9, for example, illustrates parent zones formed by combining the adjacent two-track zones in FIG. 8, beginning at track 1. Again, however, it will be noted that no target zone is clearly discernible because both zone 1-4 and zone 17-24 have the highest density access command counts of eleven. As above, in some embodiments the command queue controller 198 will select one or both of the highest density zones for pushing commands.

Figure 10:
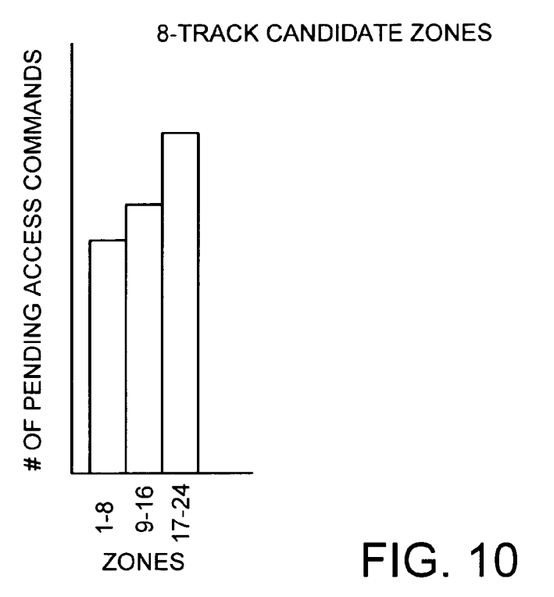
FIG. 10 is a histogram of the pending access command densities for the data set of FIG. 7 and a candidate grandparent zone size of eight tracks.

In other embodiments, however, the command queue controller 198 can further combine the four-track parent zones of FIG. 9 into eight-track grandparent zones shown in FIG. 10. In this arrangement the data of FIG. 7 does indicate that the highest density of access commands lies in the zone 17-24, which has nineteen access commands. In some embodiments the command queue controller 198 simply selects the zone with the highest numerical density and begins pushing access commands there. In other embodiments, and especially where small differences exist in the histograms of small zone sizes, the command queue controller 198 can execute a statistical determination of differences, such as a chi-squared analysis of differences, in deciding whether to select a target zone or further modify the representation of the data.

In any event, once the target zone is selected the command queue controller 198 pushes access commands to the selected zone. In some embodiments the actuator can dwell at the selected zone until all the pending access commands have been pushed. This approach increases the likelihood that a late-arriving access command will be pushed even though it wasn't pending when pushing in that zone began. In other embodiments, however, the idea is to whittle down all the zones somewhat evenly. This approach can be advantageous because it is more likely that late-arriving access requests are accumulating in one or more other zones than in a current target zone. Accordingly, in these embodiments the command queue controller 198 pushes access commands to the selected target zone until the number of pending access commands remaining in the command queue 196 for the selected target zone is equal to or less than a predetermined threshold. For example, and not by limitation, the predetermined threshold can be the average number of pending access commands for all LBA candidate zones of the storage space. For the example above in FIG. 8, there is an average of 3.9 pending access commands for each of the two-track candidate zones. Accordingly, in some embodiments either or both zone 3-4 and/or zone 21-22 will have access commands pushed there until there are four or fewer remaining pending access commands, at which time the comparative densities could advantageously be recalculated.

Figure 11:
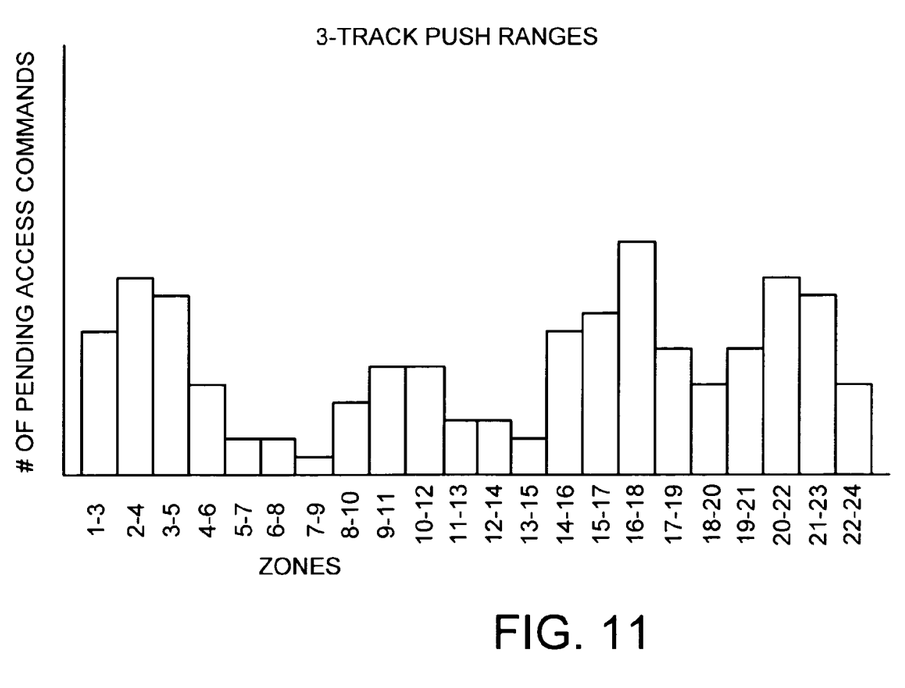
FIG. 11 is a histogram of the pending access command densities for the data set of FIG. 7 and a candidate push range zone of three tracks.

In yet other embodiments the command queue controller 198 selects the target zone by comparing numbers of pending access commands in different fixed-size LBA "push range zones" of the storage space. A "push range zone" for purposes of this description and the appended claims means a rolling zone of a fixed size. For example, FIG. 11 shows a histogram for a push range zone of three tracks wide beginning at track 1. That is, the first candidate zone consists of tracks 1-3. In the second candidate zone the first track is dropped and the fourth track is added, and so on. This push range zone can advantageously better discern the desired target zone where a clearly highest density zone isn't apparent but is surrounded by relatively higher density tracks. For example, the three-track push range zones clearly distinguish zone 16-18 as the preferred target zone, whereas the four-track parent zone of FIG. 9 did not. As above, however, if a particular push range zone does not successfully discern the target zone then it too can be modified by changing the number of LBAs in the LBA push range zones.

Figure 12:
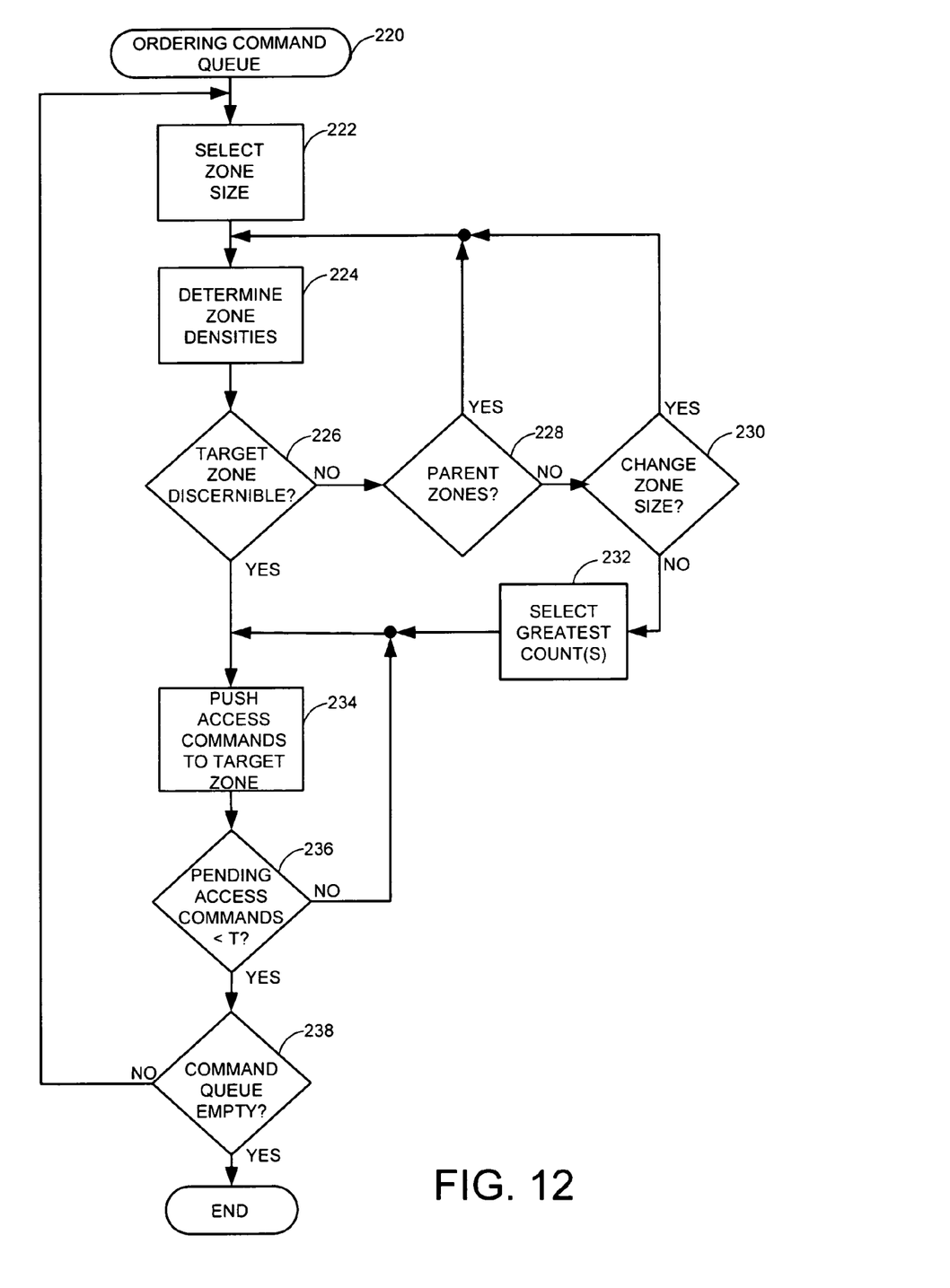
FIG. 12 is a flowchart illustrating steps for practicing a method of ORDERING A COMMAND QUEUE in accordance with embodiments of the present invention.

FIG. 12 is a flowchart of a method 220 for ORDERING A COMMAND QUEUE in accordance with embodiments of the present invention. The method 220 begins at block 222 with the command queue controller 198 selecting a zone size. In block 224 the command queue controller 198 calculates the access command densities for each of the zones. In block 226 it is determined whether a target zone is discernible from the calculated zone densities. If the determination of block 226 is no, then determinations are made in blocks 228 and 230 as to whether to form parent zones or otherwise change the size of the zones. The determination of block 230 contemplates changing the zone size to something other than a parent (or grandparent, great-grandparent etc.). Block 230 also contemplates changing from fixed-size discrete zones, as in FIGS. 8-10, to a push range zone as in FIG. 11.

If the determinations of blocks 228 and 230 are both no, then in block 232 the command queue controller 198 can select one or more of the highest density zones as the target zone. Control then passes, the same as if the determination of block 226 is yes, to block 234 where the command queue controller 198 passes pending access commands to the selected target zone. In block 236 it is determined whether a remaining number of pending accesses associated with the selected target zone is less than a predetermined threshold. If no, then control returns to block 234. If the determination of block 236 is yes, then in block 238 it is determined whether the command queue 196 is empty. If no, then in block 239 the zone size is reset to the size previously selected in block 222 and control returns to block 224; otherwise the method 220 ends.

In the embodiments discussed above the command queue controller 198 is contained within the controller 108 in the MDA 101. This description is only illustrative and not limiting to the scope of the present embodiments, which also contemplates placing some or all of the functionality of the command queue controller within the host 102 or some other external device therebetween the host and the MDA 101, or within the data storage device 114.

Summarizing generally, preferred embodiments of the present invention are characterized as a data storage system having a transducer in a data transfer relationship with a storage space, and means for ordering commands in a command queue to push the commands to the storage space. The skilled artisan will understand from this description that the meaning of the term "means for ordering commands," for purposes of this description and the appended claims, requires the circuitry to determine the pending access command densities in each of the candidate zones, and to then select a target zone in relation to the highest discernible density.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the devices in which they are incorporated or the particular environment in which they are used without departing from the spirit and scope of the present invention.

In addition, although the illustrative embodiments described herein are directed to a data storage system, it will be appreciated by those skilled in the art that the claimed subject matter is not so limited and various other electronic devices can utilize the embodiments of the present invention without departing from the spirit and scope of the claimed invention.

What is claimed is:

1. A data storage system comprising a command queue controller that defines an order with which pending access commands pass out of a command queue, the order characterized by periodically selecting a target zone from a predefined plurality of different candidate zones, at least two of the candidate zones being nonadjacent to each other, and passing only selected pending access commands that are associated with the target zone until a number of non-passed selected pending access commands is less than a predefined threshold, wherein the target zone is selected in relation to which of the plurality of candidate zones is instantaneously associated with a comparative greatest number of the pending access commands.

2. The data storage system of claim 1 wherein the command queue controller circuit selects the target zone by comparing numbers of pending access commands in different fixed-size LBA zones of the storage space.

3. The data storage system of claim 1 wherein the predetermined threshold is an average number of pending access commands for all LBA zones of the storage space.

4. The data storage system of claim 2 wherein the command queue controller circuit selects the target zone by performing a statistical determination of significant difference on numbers of pending access commands in the LBA zones of the storage space.

5. The data storage system of claim 4 wherein the command queue controller circuit selects the target zone by comparing densities of pending access commands in different fixed-size LBA parent zones that are derived by combining groups of the LBA zones into the LBA parent zones.

6. The data storage system of claim 5 wherein the command queue controller circuit selects the target zone by performing a statistical determination of significant difference on number of pending access commands in the LBA parent zones of the storage space.

7. The data storage system of claim 1 wherein the command queue controller circuit selects the target zone by comparing numbers of pending access commands in different fixed-size LBA push range zones of the storage space.

8. The data storage system of claim 7 wherein the command queue controller circuit selects the target zone by performing a statistical determination of significant difference on numbers of pending access commands in the LBA push range zones of the storage space.

9. The data storage system of claim 4 wherein the command queue controller circuit selects the target zone by comparing densities of pending access commands in different fixed-size LBA modified push range zones that are derived by changing the number of LBAs in the LBA push range zones.

10. A method comprising: dividing a storage space into a plurality of LBA zones, at least two of the LBA zones being nonadjacent to each other;
   selecting a target zone of the plurality of LBA zones in relation to a comparative number of pending access commands in a command queue for each of the plurality of LBA zones; and
   ordering a passing of the pending access commands out of the command queue to the target zone in response to the selecting step until a number of non-passed pending access commands is less than a predefined threshold.

11. The method of claim 10 wherein the selecting step is characterized by performing a statistical determination of significant difference on numbers of pending access commands in the LBA zones of the storage space.

12. The method of claim 10 wherein the selecting step is characterized by comparing densities of pending access commands in different fixed-size LBA parent zones that are derived by combining groups of the LBA zones into the LBA parent zones.

13. The method of claim 10 wherein the selecting step is characterized by comparing numbers of pending access commands in different fixed-size LBA push range zones of the storage space.

14. The method of claim 13 wherein the selecting step is characterized by comparing densities of pending access commands in different fixed-size LBA modified push range zones that are derived by changing the number of LBAs in the LBA push range zones.

* * * * *